United States Patent
Auguet et al.

(10) Patent No.: US 8,036,793 B2
(45) Date of Patent: Oct. 11, 2011

(54) VEHICLE STEERING CONTROL WITHOUT MECHANICAL CONNECTION BETWEEN THE STEERING WHEEL AND THE STEERED WHEELS

(75) Inventors: Thierry Auguet, Chapelle Glâne (CH); Marc Sebe, Neyruz (CH)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 1049 days.

(21) Appl. No.: 11/909,758

(22) PCT Filed: Mar. 24, 2006

(86) PCT No.: PCT/EP2006/002720
§ 371 (c)(1),
(2), (4) Date: Sep. 26, 2007

(87) PCT Pub. No.: WO2006/103030
PCT Pub. Date: Oct. 5, 2006

(65) Prior Publication Data
US 2008/0177445 A1    Jul. 24, 2008

(30) Foreign Application Priority Data
Apr. 1, 2005 (FR) .................................. 05/03275

(51) Int. Cl.
*B62D 6/00* (2006.01)
*G05D 1/00* (2006.01)
*G06F 7/00* (2006.01)
(52) U.S. Cl. .................. 701/42; 701/1; 701/22; 701/41; 701/73
(58) Field of Classification Search .................. None
See application file for complete search history.

(56) References Cited

U.S. PATENT DOCUMENTS
5,347,458 A * 9/1994 Serizawa et al. ................ 701/41
(Continued)

FOREIGN PATENT DOCUMENTS
DE     102 21 721 A    11/2003
(Continued)

OTHER PUBLICATIONS
International Search Report dated Jun. 7, 2006, in PCT/EP2006/002720.
(Continued)

*Primary Examiner* — Khoi Tran
*Assistant Examiner* — Ian Jen
(74) *Attorney, Agent, or Firm* — Fitzpatrick, Cella, Harper & Scinto (57) ABSTRACT

A steering control system is provided for a vehicle with a steered wheel. The vehicle includes a control member that maneuvers within a range between leftward and rightward stops, and that delivers a requested steering signal. The steering control system includes: an actuator that acts on a steering angle of a steered wheel, and a controller that determines a control angle for controlling the actuator to steer the vehicle. The controller includes: a first unit that determines, according to the vehicle's speed and a parameter characteristic of the vehicle's equilibrium, a maximum steering angle on a steered wheel of an equivalent bicycle model of the vehicle, a second unit that determines a gearing-down ratio according to the range of the control member and the maximum steering angle, and a third unit that determines a steering angle according to the gearing-down ratio and the requested steering signal.

24 Claims, 5 Drawing Sheets

U.S. PATENT DOCUMENTS

| | | | | |
|---|---|---|---|---|
| 5,348,111 | A * | 9/1994 | Williams et al. | 180/415 |
| 6,155,377 | A * | 12/2000 | Tokunaga et al. | 180/446 |
| 6,192,304 | B1 | 2/2001 | Goetz | 701/41 |
| 6,266,599 | B1 | 7/2001 | Van Zanten et al. | 701/71 |
| 6,449,542 | B1 * | 9/2002 | Bottiger et al. | 701/41 |
| 6,549,835 | B2 * | 4/2003 | Deguchi et al. | 701/41 |
| 6,820,715 | B2 * | 11/2004 | Laurent et al. | 180/443 |
| 6,865,461 | B2 * | 3/2005 | Neef et al. | 701/41 |
| 6,871,125 | B2 * | 3/2005 | Oshima et al. | 701/22 |
| 6,931,313 | B2 * | 8/2005 | Kato et al. | 701/41 |
| 7,032,705 | B2 * | 4/2006 | Zheng et al. | 180/446 |
| 7,096,098 | B2 * | 8/2006 | Auguet et al. | 701/22 |
| 7,100,733 | B2 * | 9/2006 | Zhao | 180/402 |
| 7,191,048 | B2 * | 3/2007 | Aizawa et al. | 701/73 |
| 7,234,563 | B2 * | 6/2007 | Ogawa et al. | 180/402 |
| 7,325,644 | B2 * | 2/2008 | Sakai | 180/402 |
| 7,395,142 | B2 * | 7/2008 | Mori | 701/42 |
| 7,418,327 | B2 * | 8/2008 | Pelchen et al. | 701/41 |
| 7,520,367 | B2 * | 4/2009 | Nakatsu et al. | 180/444 |
| 2002/0157746 | A1 | 10/2002 | Merino-Lopez et al. | 152/209.5 |
| 2004/0040778 | A1 * | 3/2004 | Katou et al. | 180/402 |
| 2004/0111200 | A1 | 6/2004 | Rao et al. | 701/45 |
| 2008/0114514 | A1 * | 5/2008 | Auguet et al. | 701/42 |

FOREIGN PATENT DOCUMENTS

| | | |
|---|---|---|
| WO | 02/090169 A | 11/2002 |
| WO | 2004/080782 A | 9/2004 |

OTHER PUBLICATIONS

C.D. Gadda et al., "Incorporating a Model of Vehicle Dynamics in a Diagnostic System for Steer-by-Wire Vehicles," International Symposium on Advanced Vehicle Control, AVEC '04, Arnhem, The Netherlands, 6 total pages (Aug. 23-27, 2004).

R.A. Anderson, "Using GPS for Model Based Estimation of Critical Vehicle States and Parameters," Master of Science Thesis, Auburn University, 179 total pages, (Dec. 27, 2004).

\* cited by examiner

VEHICLE STEERING CONTROL WITHOUT MECHANICAL CONNECTION BETWEEN THE STEERING WHEEL AND THE STEERED WHEELS

FIELD OF THE INVENTION

The present invention relates to motor vehicle steering, more particularly to steering systems without mechanical connection between the control member (in general a steering wheel) and the steered wheel or wheels. This steering system architecture is particularly appropriate in the case of steering with electrical control.

PRIOR ART

In the prior art, the steering of a passenger vehicle is, the majority of the time, controlled by means of a steering wheel mechanically connected to the steered wheels. The driver acts by rotation on the steering wheel in one direction or the other in order to orient the vehicle in one direction or the other. In this way, the driver confers a yawing movement on the vehicle. The steering is usually assisted and electrical steering assistance is tending to replace hydraulic assistance, without eliminating the mechanical connection between the steering wheel and steered wheels.

In addition, purely electrical control means for all the actuators of a motor vehicle are being developed more and more. In the case of the steering, this technology is referred to by the very popular English expression "steer by wire". This consists of replacing by electrical connections the connections which at the present time are in general mechanical, sometimes hydraulic, between the steering control (for example a steering wheel) and the steered wheels. The steered wheels are connected to one of the electrical actuators capable of at any time causing and controlling the steering on the steered wheels. There is therefore no mechanical connection connecting the steered wheels and the steering wheel when turning. The commands made by the driver of the vehicle on his steering wheel are converted into an electrical signal. The electrical actuators themselves receive an electrical signal. The whole of the steering system is managed by a controller capable of controlling the electrical actuators in a suitable way.

The advantage of this technology is that it goes ideally with progress in electronics, which makes possible more and more sophisticated feedback controls and which makes it possible to put the steering of the wheels not only under the control of a manual control exerted by the driver of the vehicle but also under the control of a safety system which continuously analyses the actual situation with the vehicle and introduces the necessary corrections for maintaining the stability of the functioning of the vehicle. Thus, for example, it is possible to impart to the steered wheels a steering angle which takes account not only of the command from the driver of the vehicle but also dynamic parameters observed on the vehicle, for example in order to attenuate an understeer or prevent oversteer.

The systems for controlling steering by purely electrical method also open up new possibilities for the construction of vehicles since there is no longer the constraint of the volume and location of the mechanical steering column. This makes it possible for example to more easily produce vehicles sometimes for driving on the right and sometimes for driving on the left. The disappearance of the steering column also improves the safety of the driver.

The prior art already knows many proposals for installing all the necessary elements for effectively allowing steering of the wheels. The U.S. Pat. No. 5,347,458 proposes an electrical device for controlling the steered wheels and the implementation of a feedback at the steering wheel. The demand proposed in this patent takes account of the transverse acceleration and the yaw acceleration of the vehicle. The U.S. Pat. No. 5,348,111 proposes a steering system whose control includes not only the transverse acceleration and the yaw acceleration of the vehicle but also the longitudinal speed of the vehicle. It can be seen that the parameters taken into account by the electrical steering systems already known in the prior art are the transverse acceleration, the yaw acceleration and the speed of the vehicle.

Amongst the latitudes that are novel or facilitated by an electrical steering system, it is also possible to cite the fact of more easily providing that all the wheels of a vehicle are steered. By way of illustration, U.S. Pat. No. 6,192,304 proposes an electrical steering system for a vehicle with four wheels all steered. Likewise, U.S. Pat. No. 6,549,835 also proposes an electrical steering system for vehicles with four steered wheels whose control also uses a vision device.

Whatever the sophistication of the systems for controlling the steering of a vehicle, in particular from the point of view of the intervention of safety systems for preventing the vehicle leaving a normal operating path, at the basis, the problem is always posed of a control which is robust and pleasant for the driver, for calculating the angle at which each of the steered wheels will be turned according to the instructions of the driver, and this problem is poorly resolved in the prior art.

In particular, it is desirable to introduce variable ratio between the command that the driver of the vehicle imposes on his steering wheel and the angle at which the steered wheels are turned, in order to facilitate the low-speed maneuvers without compromising the stability at high speed. In this context, it is also necessary to guard against the detrimental consequences that an action by the driver of an excessively great magnitude could have on the stability of the vehicle.

BRIEF DESCRIPTION OF THE INVENTION

To resolve this problem, the invention proposes a steering control system with variable ratio for a land vehicle comprising at least two wheels, at least one of which is steered, comprising a control member available to a driver for acting on the steering of vehicle, the said control member being able to be maneuvered within a maximum range between a stop to the left and a stop to the right and delivering a requested steering signal quantified in terms of amplitude and direction, the said steering system comprising at least one actuator for acting on the steering angle of the at least one steered wheel, the said steering system comprising a controller using as input variables at least the speed of the vehicle and the said requested steering signal in order to determine, for each of the actuators, a control angle according to which the actuator is controlled for the steering, in which the controller comprises:

a first unit for determining, at least according to the speed of the vehicle and a parameter characteristic of the equilibrium of the vehicle, a maximum steering angle on the single steered wheel of an equivalent bicycle model of the vehicle, a second unit for determining a gearing-down ratio according to the said maximum range of the control member and the said maximum steering angle, a final unit for determining the said steering angle or angles according to the said gearing-down ratio and the said requested steering signal.

Although the main purpose of the invention is to produce a steering system with a totally electric control, and therefore the actuators of the steered wheels are consequently electrical, it is conceivable to apply the means disclosed above, using a determination of a suitable gearing-down ratio to a steering control system in which the actuators are hydraulic. This possibility will not be revisited hereinafter.

Before continuing, it should be emphasised that the present invention concerns only the actual steering control of each of the steered wheels of a vehicle, without being concerned with the feel at the steering wheel (or equivalent member such as a joystick) of the vehicle by the driver. This is because, through the mechanical independence between the steered wheels and the steering wheel available to the driver of the vehicle, the force felt at the steering wheel must in any event be reconstructed and created by dedicated means. Various systems can be imagined, the reader being referred solely by way of illustration, for example, to U.S. Pat. No. 5,347,458 which deals with this question. In any event, in order to ensure a certain sensation at the steering wheel, a person skilled in the art understands that it is necessary to install either a mechanical system for returning to the straight-line position, such as a simple spring, or a more sophisticated system comprising for example an electric motor controlled in a suitable way in order to transmit a force to the steering wheel, a force which is pertinent vis-à-vis the attitude of the vehicle and/or the commands from the driver.

Thus, through the mechanical independence between the steering control of the steered wheels and the action of the driver on his steering wheel (or equivalent member), the two aspects, namely on the one hand the effective steering control of the steered wheels and on the other hand the control of a device mechanically coupled to the steering wheel, can be dealt with separately, even if they interact. It is possible to deal with the steered wheel steering control aspect without dealing with the aspect of reconstruction of a certain feel at the steering wheel, or vice versa.

The present invention concerns only the wheel steering control and is potentially compatible with a great variety of principles of force reconstruction at the steering wheel.

In a particular embodiment, the parameter characteristic of the equilibrium of the vehicle chosen is a selected maximum transverse acceleration value $\gamma_{y\ max}$ of the vehicle. In particular, this parameter can have a constant value in the steering control system as installed on the vehicle. For example, by design, the maximum transverse acceleration $\gamma_{y\ max}$ adopted for the vehicle is equal to one G (G is the gravity acceleration value and is equal to approximately 9.81 m/s$^2$). To end up at this choice, the basis is taken of the experimentally known fact that, on normally adherent dry ground, for a standard passenger vehicle, an acceleration of one G corresponds substantially to the maximum value at which the tyres remain capable of transmitting the horizontal forces to the ground both in a longitudinal direction and in the transverse direction.

It should be noted that this parameter can in fact be adjusted in the vehicle development phases, by testing and/or simulation. Another advantage of the invention is making it possible to design a steering control for a purely electrical system which can easily be developed according to the specificities of each of the vehicles that it is wished to equip with such electric steering. For example, a vehicle with a sporting character, where the centre of gravity is very low, whose tyres are capable of developing high drift thrusts and benefit from very high adhesion values, can function with a transverse acceleration parameter with a value above one G. In addition, a vehicle with a family character, more particularly MPVs or leisure vehicles, where the centre of gravity is fairly high compared with the track width of these vehicles, must function with much lower maximum transverse acceleration values, possibly less than one G, in order to remain within safety conditions.

As for the variable character of the gearing down, the present invention proposes to take account of this in the following way. It is chosen that, at all speeds of movement of the vehicle, the driver can use his steering wheel or any other appropriate member over the whole of the range, that is to say from one full steering to other. For example, he may turn his steering wheel by half a turn at a maximum, both towards the left and towards the right. The gearing down existing between the steering wheel and the steered wheels is at any time obtained by calculation, taking account of the longitudinal speed of the vehicle. Naturally, the lower the speed of the vehicle, the greater the effective steering angle of the steered wheels, up to the maximum mechanically possible having regard to the design of the mechanical parts, at speeds close to zero. And the higher the speed of the vehicle, the lower will be made the maximum steering angle allowed by the controller, even for a maximum amplitude of angle at the steering wheel.

Advantageously, the invention can also be implemented if the maximum transverse acceleration is not a parameter chosen once and for all, which remains constant during the operation of the vehicle, but is a parameter which is itself calculated in real time according to the conditions of use of the vehicle. By way of illustration, the reader is referred to the patent application US 2002/0157746 which describes how it is possible to acquire in real time an estimation of the coefficient of adhesion prevailing in the tyre/roadway contact. More particularly, this patent application describes how it is possible to estimate the margin of adhesion remaining available at any time. On the basis of this and having regard to the geometric characteristics of the vehicle (track width, wheelbase, height of the centre of gravity), it is possible to calculate at any time the maximum acceptable transverse acceleration. Thus it can be seen that the invention is well adapted to take account of the actual conditions prevailing during the movement of a vehicle, which is in itself a great safety and pleasure factor.

To simplify the disclosure, there will be no further mention below about the way in which it is possible to acquire or choose the maximum transverse acceleration value used in the system proposed by the invention, but rather the way in which it is possible to acquire the longitudinal speed of the vehicle or the angle imposed by the driver by his actions on the steering wheel. The following description illustrates several applications of the invention in the particular case of a vehicle with four wheels, it being understood that the invention can be applied to a vehicle with three wheels, at least one of which is steered, or even to a vehicle with two wheels, at least one of which is steered. There are proposed various implementations of the invention which are distinguished by the number of steered wheels, namely two steered wheels or all the wheels on the vehicle are steered, and which are also distinguished by the fact that, on a steered axle, the actuator which controls the steering on the wheels is unique or on the contrary that each steered wheel has its own actuator.

BRIEF DESCRIPTION OF THE FIGURES

The present invention will be more clearly understood by virtue of the consultation of the various embodiments described with the help of the following figures.

DESCRIPTION OF THE PREFERRED EMBODIMENTS OF THE INVENTION

Before continuing, the following various notations should be agreed:
- the reference "1" in general designates a steered wheel whilst the reference "7" in general designates a non-steered wheel;
- when a reference is accompanied by an index "$_{Ft}$", this means that the object designated by the reference concerns the front of the vehicle and when a reference is accompanied by an index "$_{Rr}$", this means that the object designated by the reference concerns the rear of the vehicle;
- when a reference is accompanied by the index "$_R$", this means that the object designated by the reference concerns the right-hand side of the vehicle and when a reference is accompanied by an index "$_L$", this means that the object designated by the reference concerns the left-hand side of the vehicle;
- "$\theta_{max}$" relates to the maximum range in which the driver of the vehicle can manoeuvre a control membrane in order to act on the steering of the vehicle; more particularly, in all implementations proposed, it is a case of a steering wheel that is maneuvered over a predetermined angular range (the concept of angle is not limiting as it is possible to substitute for the steering wheel any equivalent device such as a joystick or slider); the steering wheel is maneuvered from $-\theta_{max}$ to $+\theta_{max}$ and "$\theta$" designates any particular value characterising the command that the driver imposes, characterised in terms of amplitude and sign;
- it being noted that all the vehicles to which the invention can be applied can be modelled by an equivalent bicycle model, a well known type of modelling, it will be considered that a single wheel of this model is steered and "$\beta$" designates the steering angle of this steered wheel, and "$\beta_{max}$" the maximum value that this angle can take.

Figure 1:
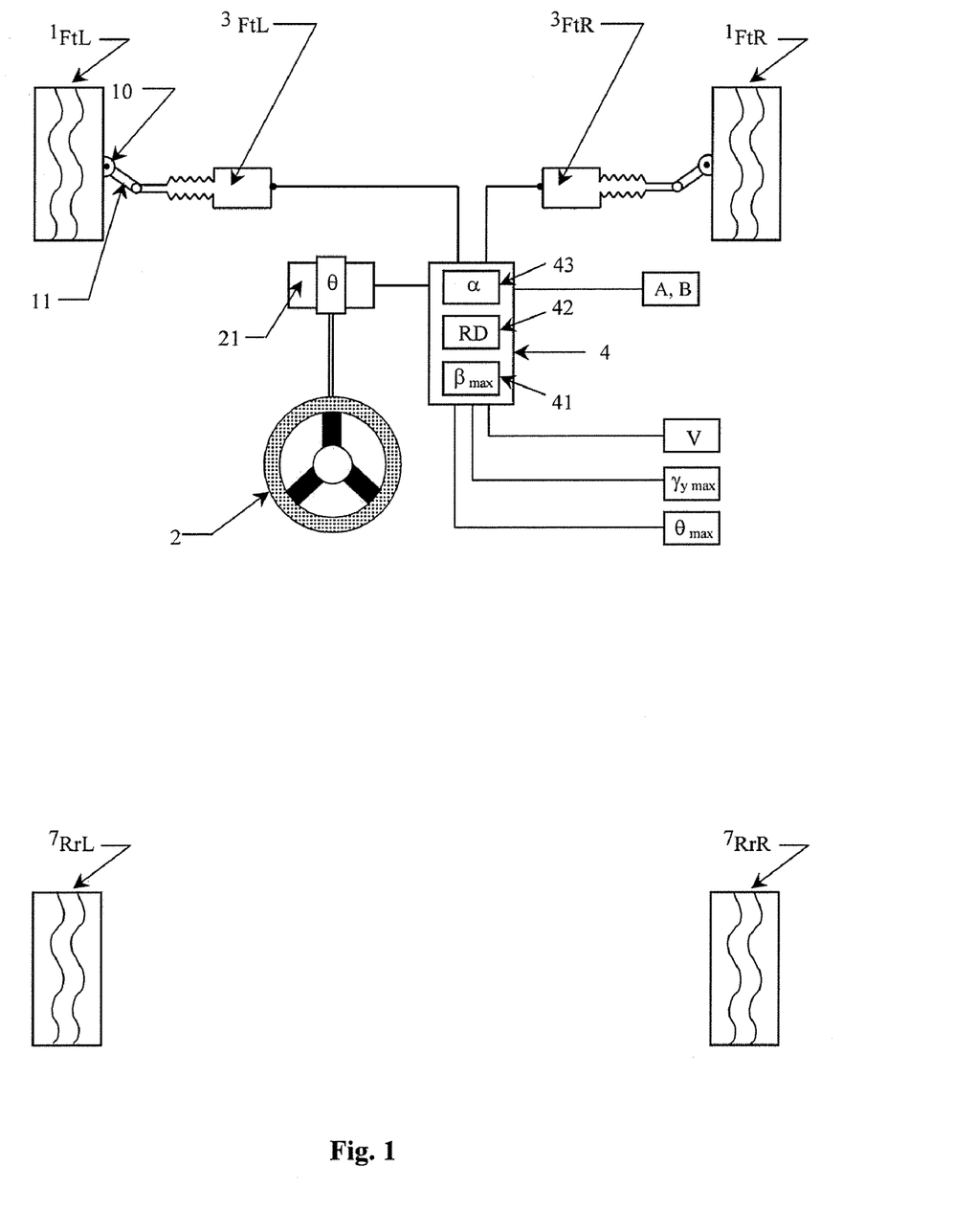
FIG. 1 shows a layout diagram of an electrical steering system on a vehicle with four wheels in which only the front axle is steered and the steered wheels each comprise their own actuator.

FIG. 1 shows diagrammatically a vehicle with four wheels where the front axle comprises two steered wheels. The wheels are denoted $1_{FtL}$ for the left-hand front wheel, $1_{FtR}$ for the right-hand front wheel, $7_{RrL}$ for the left-hand rear wheel and $7_{RrR}$ for the right-hand rear wheel. The steered wheels are mounted on a wheel carrier (not visible) and turn about a pivot axis 10. A lever 11 controlling the steering is mounted so as to be fixed to the wheel carrier. Each steered wheel is turned by an electrical actuator $3_{FtL}$, $3_{FtR}$ connected on the one hand to the body or chassis of the vehicle and on the other hand to the lever 11, in order to control the steering angle of the wheel in question. Each electrical actuator $3_{FtL}$, $3_{FtR}$ comprises for example a screw and nut device (not shown) actuated by a rotary electric motor. The screw of the screw and nut device is connected to the steering control lever 11. Each actuator preferably comprises a position sensor in order, if necessary by geometric construction and associated calculations, to know from the measurement delivered by the position sensor the exact angular position of the steered wheel in question. By way of example, it is possible to use the electrical actuators described in the U.S. Pat. No. 6,820,715.

There can also be seen a steering wheel 2 mechanically connected to a device 21 for measuring the angle $\theta$ at the steering wheel. A controller 4 controls the steering of the steered wheels. The controller 4 uses the input variables consisting of the speed of the vehicle V and the steering signal $\theta$ as resulting from the actions of the driver on his control. The controller 4 also uses the maximum amplitude parameters $\theta_{max}$ characterising the control available to the driver and transverse acceleration $\gamma_{y\ max}$ that the vehicle can withstand.

Figure 2:
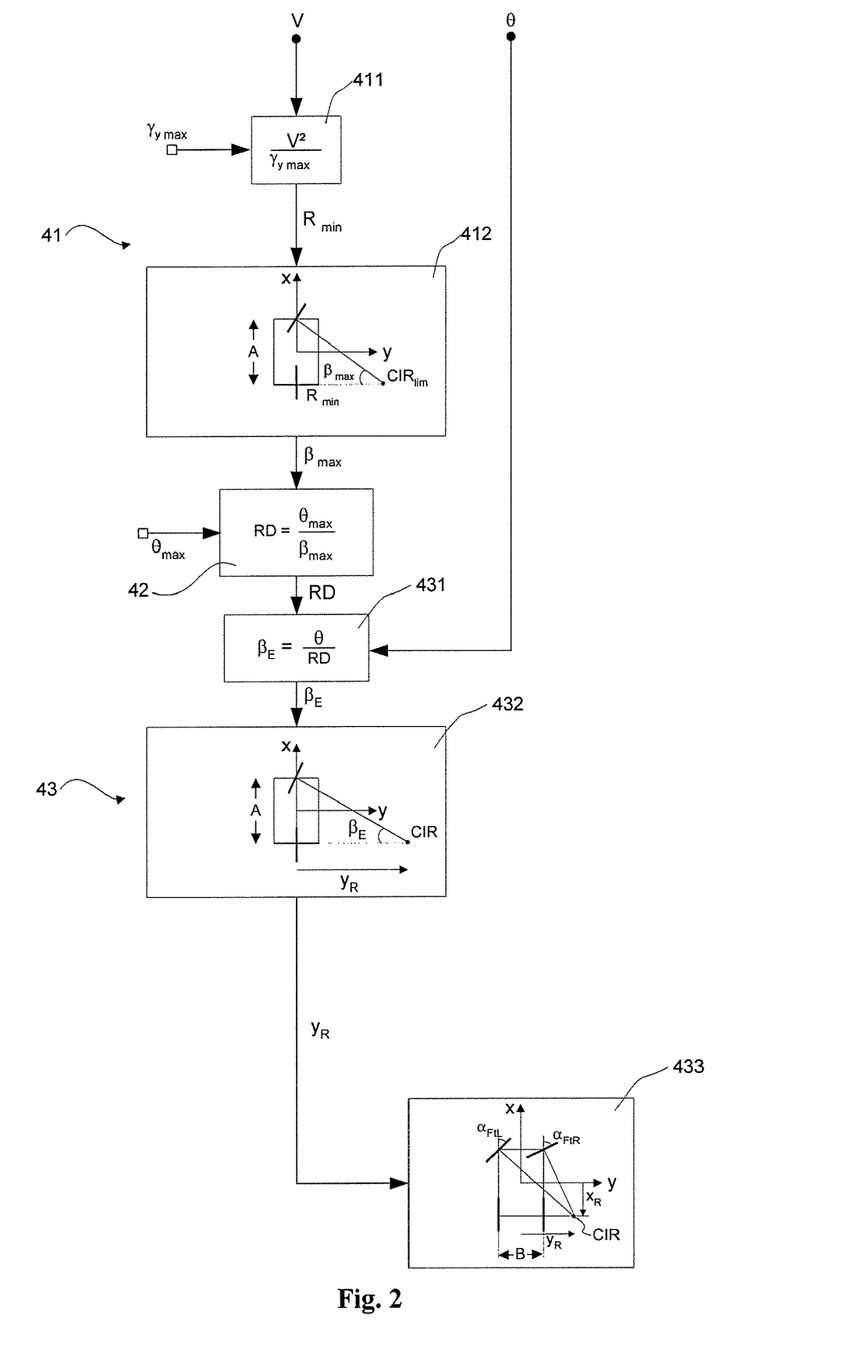
FIG. 2 is a block diagram illustrating the controller according to the invention in the application in FIG. 1.

FIG. 2 describes in more detail the arrangement of the controller 4. The parameters used by the controller 4 are represented in FIG. 2 by small squares and the variables by dots. From the instantaneous value of the longitudinal speed V of the vehicle and having regard to the maximum transverse acceleration parameter $\gamma_{y\ max}$, a first unit 41 determines, at least according to the speed of the vehicle, a maximum steering angle ($\beta_{max}$) on the single steered wheel of an equivalent bicycle model of the vehicle.

To this end, advantageously, a first block 411 of the first unit 41 of the controller 4 determines the minimum radius $R_{min}$ around which the path of vehicle can fit by proceeding with the following mathematical operation: the minimum radius $R_{min}$ is proportional to the square of the speed V divided by the maximum transverse acceleration $\gamma_{y\ max}$. Next, for example, a second block 412 of the first unit 41 of the controller 4 determines the maximum axle steering angle $\beta_{max}$ relating to an equivalent bicycle modelling, on the basis of the wheelbase value A of the vehicle and the minimum radius $R_{min}$ calculated previously.

In FIG. 2, it can be seen that the second block 412 comprises the schematic representation of a bicycle vehicle (equivalent to a vehicle with four wheels often sufficient in modelling) in which the rear wheel is non-steered and the front wheel is steered. It is also possible to see the reference axes x and y with respect to which there will be determined the longitudinal (x axis) and transverse (y axis) coordinates of the instantaneous centre of rotation CIR. It is chosen to comply with the principle of Ackerman's diagram. This means that the site of the instantaneous centre of rotation of the vehicle is situated on the straight line perpendicular to the plane of the rear wheel and passing through the centre of the rear wheel of the vehicle. The limit instantaneous centre of rotation $CIR_{lim}$ is obtained by referring to the said site the minimum radius value $R_{min}$ from the plane of the rear wheel. The limit instantaneous centre of rotation $CIR_{lim}$ is thus known, the centre of the area of contact of the rear wheel and the said limit instantaneous centre of rotation are connected by a straight-line segment and the maximum front axle steering angle $\beta_{max}$ between the latter straight-line segment and the extension of the rear axle is obtained.

A second unit 42 determines a gearing-down ratio RD between the control available to the driver of the vehicle and the steered wheel or wheels. Non-limitingly, it is considered for this purpose that, at the speed V, the gearing-down ratio RD is constant over the entire range of maneuvering of the steering wheel. The gearing-down ratio that will be determined depends on the design characteristics of the vehicle such as the angle parameter $\theta_{max}$, and performance characteristics of the vehicle such as the maximum transverse acceleration parameter that made it possible to determine the angle $\beta_{max}$. The gearing-down ratio RD is obtained by ensuring that the maximum angle of the wheels is obtained at the maximum steering of the steering wheel 2. The gearing-down ratio RD is obtained by dividing the said maximum range $\theta_{max}$ of the control member by the said maximum steering angle $\beta_{max}$. The gearing-down ratio RD thus calculated makes it possible to never exceed the maximum transverse acceleration of which the vehicle is capable at the speed which it moves when the driver turns his steering wheel fully.

Consequently the invention makes it possible to never exceed the stability conditions of the path of the vehicle.

Finally, a final unit 43 determines the steering angles $\alpha_{FtL}$ and $\alpha_{FtR}$ of each of the steered wheels $1_{FtL}$ and $1_{FtR}$ according to the said gearing-down ratio RD and the said requested steering signal $\theta$. A first block 431 of the final unit 43 determines first of all an equivalent steering angle $\beta_E$ on the steered wheel of the equivalent bicycle mode. This equivalent steering angle $\beta_E$ is very simply obtained by dividing the said steering signal $\theta$ as resulting from the command made by the driver by the gearing-down ratio RD.

A second block 432 proceeds with the following operations. In this example, only the front axle being steered, in order to comply with Ackerman's diagram and as disclosed above, the site of the instantaneous centre of rotation of the vehicle is a straight line aligned with the rear axle of the vehicle. On the bicycle model, the steered wheel is turned through the said equivalent steering angle $\beta_E$ and then the intersection is located between a straight line perpendicular to the plane of the non-steered wheel of the bicycle model and a straight line perpendicular to the plane of the steered wheel of the bicycle model thus turned through the said equivalent steering angle $\beta_E$. This intersection supplies, for the remainder of the calculations, the transverse coordinate $y_R$ of the instantaneous centre of rotation of the vehicle.

A third block 433 makes it possible to determine the control angle $\alpha_{1FtL}$ and $\alpha_{1FtR}$ of each of the steered wheels in the following way. It should be stated that, in this example, the site of the instantaneous centre of rotation of the vehicle is a straight line aligned with each of the centres of the areas of contact of the wheels on the rear axle, that is to say a straight line extending the rear axle of the vehicle. The longitudinal coordinate $x_R$ of the instantaneous centre of rotation CIR is therefore known and always keeps the same value in this embodiment: the longitudinal coordinate $x_R$ of the instantaneous centre of rotation CIR is equal to one-half of the wheel base A (towards the negative values). Moreover, the transverse coordinate $y_R$ is transferred from the middle of the track width B of the vehicle, which exactly positions the instantaneous centre of rotation CIR. Segments are then traced which connect the said CIR to the centre of each of the said steered wheels. It then suffices to orient the steered wheels so that they are perpendicular to the said segments and the control angles $\alpha_{1FtL}$ and $\alpha_{1FtR}$ of each of the steered wheels are obtained.

In concrete terms, the various angles and coordinates disclosed above are claimed by trigonometric and geometric calculations programmed in a suitable way in the control unit 4.

Figure 3:
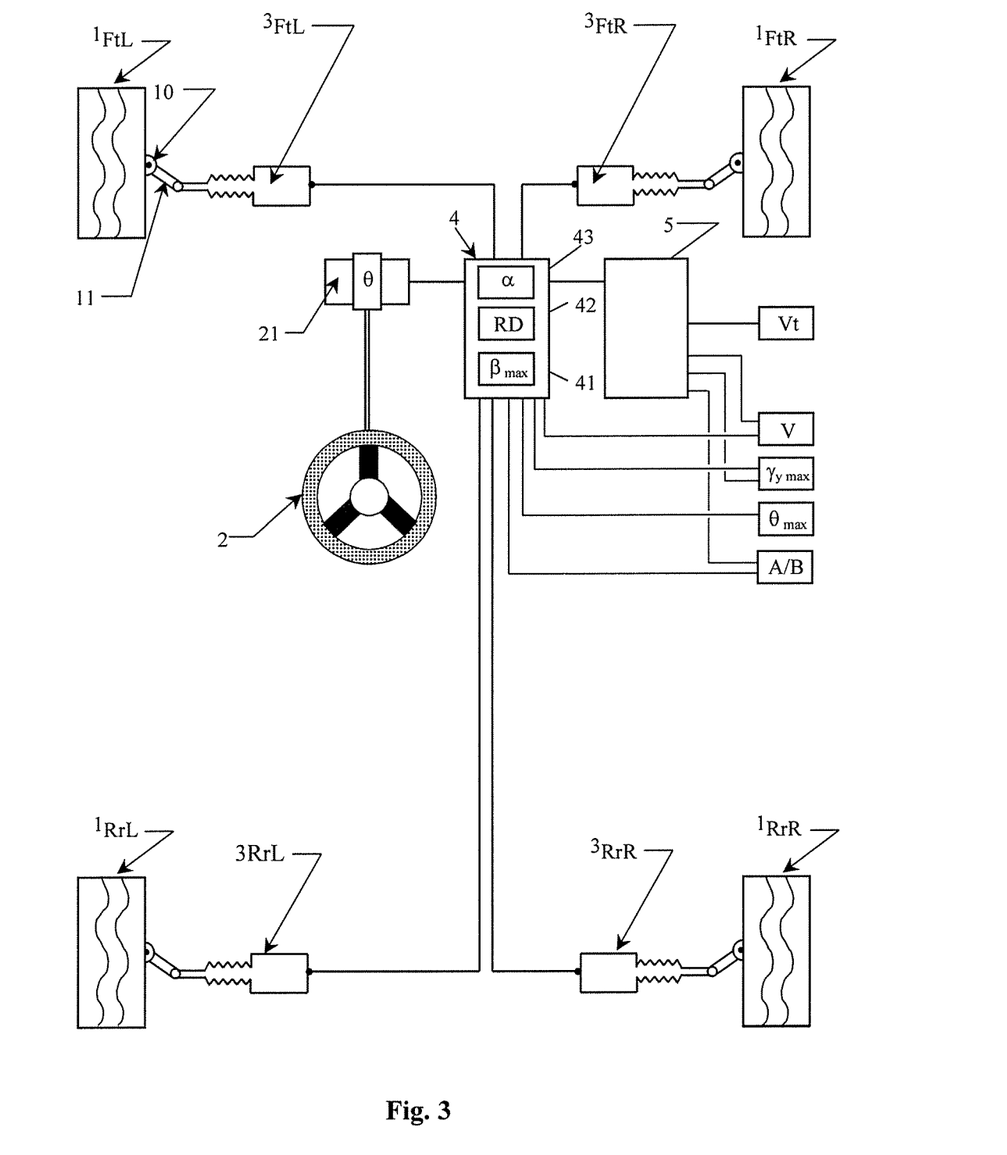
FIG. 3 shows a layout diagram of an electrical steering system on a vehicle with four wheels where all the wheels are steered and each comprise their own actuator.
Figure 4:
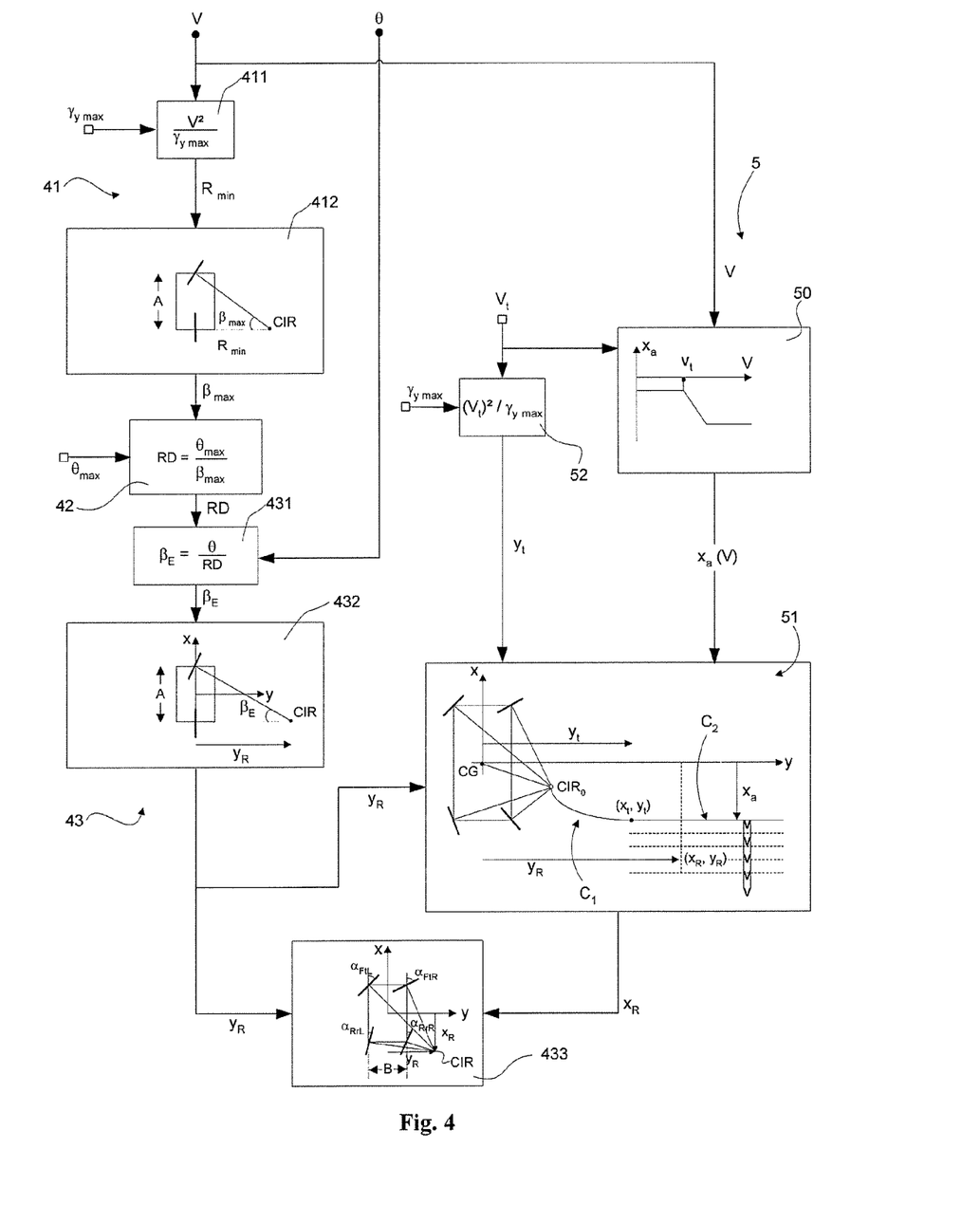
FIG. 4 is a block diagram illustrating the controller according to the invention in the application in FIG. 3.

FIGS. 3 and 4 illustrate the application of the invention to a vehicle where all the wheels $1_{FtL}$, $1_{FtR}$, $1_{RrL}$, $1_{RrR}$ are steered. The system comprises an actuator $3_{FtL}$, $3_{FtR}$, $3_{RrL}$, $3_{RrR}$ per steered wheel. The same controller 4 is found again that makes it possible to control the steering of the steered wheels. The first unit 41 and the second unit 42 are identical to that which was disclosed above. A specific adaptation of this embodiment concerns the final unit 43 and in particular its third block 433. By identical design (programming) the third block 433 is supplied by a module 5 controlling the steering behavior of the vehicle, which this time allows a dynamic calculation of the longitudinal coordinate $x_R$ of the instantaneous centre of rotation CIR of the vehicle, whilst in the previous case the longitudinal coordinate kept a constant value depending only on the wheel base A of the vehicle.

To this end, for example, a unit managing the dynamics of the vehicle 51, located in the module 5 controlling the steering behavior of the vehicle, calculates a connection curve C1 between an initial centre of rotation (CIR$_0$) at zero speed and a transition instantaneous centre of rotation ($x_t$, $y_t$) at a transition speed $V_t$ the connection curve being tangent to a straight line C2 parallel to an axle of the vehicle. Advantageously, the connection curve C1 is an ellipse.

It is very advantageous for the transverse coordinate $y_t$ of the instantaneous centre of rotation at the said transition speed to be determined using as in input parameter a maximum transverse acceleration value $\gamma_{y\ max}$. A base unit 52, installed in the module 5 controlling the steering behavior of the vehicle, provides the exploitation of this maximum transverse acceleration $\gamma_{y\ max}$ for example in a way entirely similar to that which was disclosed with regard to the first embodiment. The maximum transverse acceleration $\gamma_{y\ max}$ is either a parameter for adjusting once and for all the behavior of the vehicle, a parameter kept constant during the functioning of the vehicle, or a parameter itself calculated in real time.

In addition, it is known that, in order to promote stability at high speed, the higher the speed, there is an advantage in moving the position of instantaneous centre of rotation CIR further towards the rear of the vehicle. Quite the opposite, the lower the speed, in order to promote the handling of the vehicle, it is desirable to move the position of the instantaneous centre of rotation CIR of the vehicle towards the front of the rear axle. The precise choice of the coordinate $x_a$ is also for example adjusted experimentally, which is expressed in FIG. 4 by a diagram 50 programmed in the control module 5 and giving by direct reading the value of $x_a$ as a function of the speed V of the vehicle. Thus the longitudinal coordinate of the instantaneous centre of rotation of the vehicle $x_R$ is equal to a longitudinal coordinate $x_a$ that is a function of the speed V of the vehicle beyond the transition speed $V_t$.

The longitudinal coordinate $x_R$ of the instantaneous centre of rotation of the vehicle is determined by entering the transverse coordinate $y_R$ on the diagram 51, which makes it possible to read the longitudinal coordinate $x_R$ on a site comprising the connection curve C1 and the said straight line C2 parallel to an axle of the vehicle (according to the requested steering $\theta$) for any speed V of the vehicle below the transition speed $V_t$, and, for any speed V of the vehicle above the transition speed $V_t$, by reading the corresponding longitudinal coordinate still situated on the straight line C2 ($x_A = x_R$).

Finally, from the transverse $y_R$ and longitudinal $x_R$ coordinates of the instantaneous centre of rotation CIR, the control angles $\alpha_{1FtL}$, $\alpha_{1FtR}$, $\alpha_{1RrL}$ and $\alpha_{1RrR}$ of the four electrical actuators are obtained, for example by complying with the principle of Ackerman's diagram. The control angles $\alpha_{1FtL}$, $\alpha_{1FtR}$, $\alpha_{1RrL}$ and $\alpha_{1RrR}$ are formed by the intersection of a straight line parallel to the transverse direction of the vehicle (y axis) and a straight line passing on the one hand through the centre of the area of contact respectively of the wheels $1_{FtL}$, $1_{FtR}$, $1_{RrL}$, $1_{RrR}$ and on the other hand each time by the CIR whose coordinates are ($x_R$, $y_R$). Knowing that the coordinate $x_R$ is transferred from the middle of the wheel base A and the coordinate $y_R$ from the middle of the track width B of the vehicle, the control angles $\alpha_{1FtL}$, $\alpha_{1FtR}$, $\alpha_{1RrL}$ and $\alpha_{1RrR}$ of the four electrical actuators are obtained by trigonometric calculations.

Figure 5:
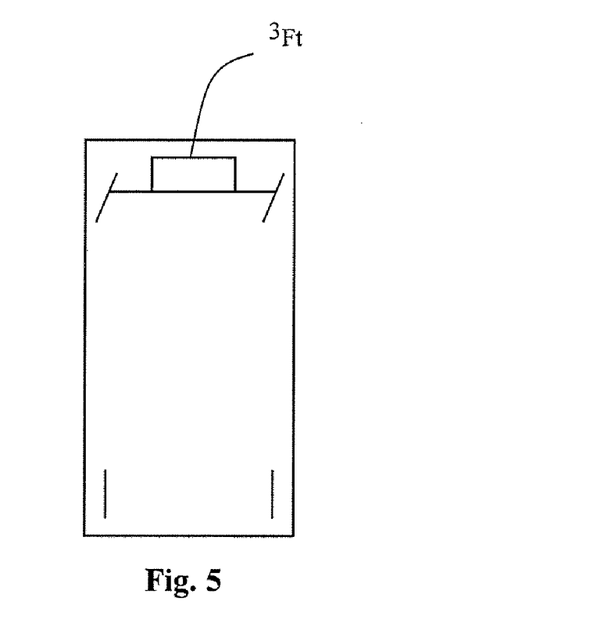
FIG. 5 shows a simplified layout diagram of an electrical steering system on a vehicle with four wheels in which only the front axle is steered and is controlled by a single actuator.
Figure 6:
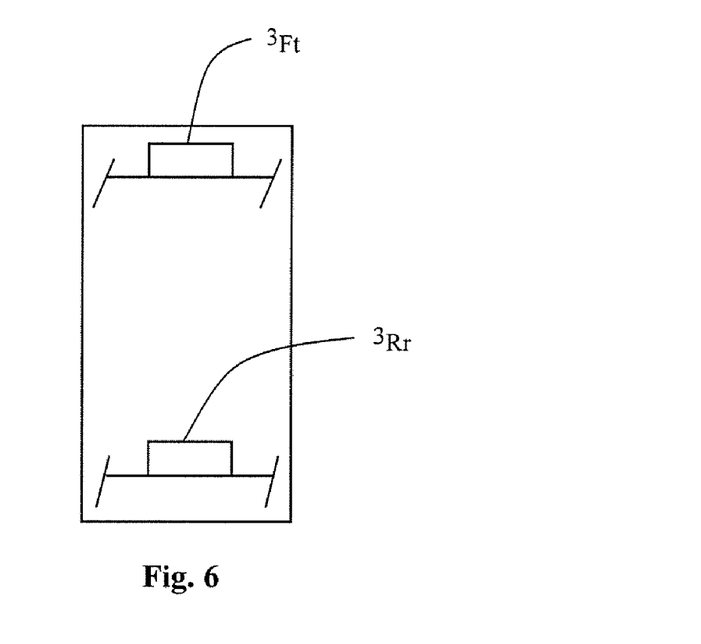
FIG. 6 shows a simplified layout diagram of an electrical steering system on a vehicle with four wheels where all the wheels are steered, each of the axles being controlled by a single actuator.

Finally, FIGS. 5 and 6 depict variant embodiments in which there is for FIG. 5 a single steered axle placed under the control of a single steering actuator $3_{Ft}$ and for FIG. 6 two steered axles each placed under the control of a single steering actuator $3_{Ft}$, respectively $3_{Rr}$. From the complete information on the embodiments in FIGS. 1 to 4, steering systems in which each of the steered wheels comprises its own steering actuator, the specificities of the embodiments in FIGS. 5 and 6 are as follows.

In the case of FIG. 5, the equivalent steering angle $\beta_E$ on the steered wheel on the equivalent bicycle model determined by the controller described for the embodiment in FIGS. 1 and 2 is directly a control angle $\alpha_{Ft}$ of the actuator $3_{Ft}$ of the front axle. This time, Ackerman's diagram is complied with by mechanical construction of the vehicle and the actuator $3_{Ft}$ of the front axle is for example an actuator moving a steering rack.

As for the steering system in FIG. 6, a suitable controller determines the longitudinal $x_R$ and transverse $y_R$ coordinates of the instantaneous centre of rotation CIR as explained for the embodiment in FIGS. 3 and 4. Next, instead of calculating four control angles, two of them are calculated, the control angle $\alpha_{Ft}$ of the front axle actuator $3_{Ft}$ and the control angle $\alpha_{Rr}$ of the rear axle actuator $3_{Rr}$ by trigonometric calculations applied to the bicycle model of the vehicle.

Finally it should be indicated that, at the control angles $\alpha$ determined according to one or other of the examples described above, the path controller can superimpose any corrections determined by a control function of the path and determines the corrected steering angle for each of the wheels, the said corrected wheel steering angle comprising a component resulting from the requested steering signal $\theta$ and a correction component.

The invention claimed is:

1. A steering control system with variable ratio for a land vehicle that includes two or more wheels, at least one of which is steered, the vehicle including a control member available to a driver for steering the vehicle, the control member being maneuverable within a maximum range between a leftward stop and a rightward stop and delivering a requested steering signal quantified in terms of amplitude and direction, the steering control system comprising:
    at least one actuator configured to act on a steering angle of the at least one steered wheel; and
    a controller that uses as input variables at least a speed of the vehicle and the requested steering signal in order to determine, for each actuator, a control angle according to which the actuator is controlled for steering the vehicle, wherein the controller includes:
        a first unit configured to determine, at least according to the speed of the vehicle and a parameter characteristic of an equilibrium of the vehicle, a maximum steering angle on a steered wheel of an equivalent bicycle model of the vehicle,
        a second unit configured to determine a gearing-down ratio according to the maximum range of the control member and the maximum steering angle,
            wherein the gearing-down ratio is determined according to
            $$RD = \theta_{max}/\beta_{max},$$
            in which RD represents the gearing-down ratio, $\theta_{max}$ represents the maximum range of the control member, and $\beta_{max}$ represents the maximum steering angle, and
            wherein the gearing-down ratio is utilized to prevent the parameter characteristic of the equilibrium of the vehicle from being exceeded, and
        a third unit configured to determine a steering angle according to the gearing-down ratio and the requested steering signal.

2. A system according to claim 1,
    wherein the first unit is configured to determine the maximum steering angle from a minimum steering radius of the vehicle, and
    wherein the minimum steering radius is determined according to the speed of the vehicle.

3. A system according to claim 1, wherein the parameter characteristic of the equilibrium of the vehicle is a maximum transverse acceleration parameter of the vehicle.

4. A system according to claim 2, wherein the parameter characteristic of the equilibrium of the vehicle is a maximum transverse acceleration parameter of the vehicle.

5. A system according to claim 3, wherein the maximum transverse acceleration parameter is a parameter of adjustment of the system and keeps a fixed value during a functioning of the system.

6. A system according to claim 4, wherein the maximum transverse acceleration parameter is a parameter of adjustment of the system and keeps a fixed value during a functioning of the system.

7. A system according to claim 3, wherein the maximum transverse acceleration parameter is calculated in real time according to conditions of use of the vehicle.

8. A system according to claim 4, wherein the maximum transverse acceleration parameter is calculated in real time according to conditions of use of the vehicle.

9. A system according to claim 1,
    wherein the vehicle includes a steered axle with two steered wheels mechanically connected in terms of steering, and
    wherein an actuator is utilized on the steered axle, so that the steering angle determined by the third unit is unique and is a function of the gearing-down ratio and the requested steering signal.

10. A steering control system with variable ratio for a land vehicle that includes two or more wheels, at least one of which is steered, the vehicle including a control member available to a driver for steering the vehicle, the control member being maneuverable within a maximum range between a leftward stop and a rightward stop and delivering a requested steering signal quantified in terms of amplitude and direction, the steering control system comprising:
    at least one actuator configured to act on a steering angle of the at least one steered wheel; and
    a controller that uses as input variables at least a speed of the vehicle and the requested steering signal in order to determine, for each actuator, a control angle according to which the actuator is controlled for steering the vehicle, wherein the controller includes:
        a first unit configured to determine, at least according to the speed of the vehicle and a parameter characteristic of an equilibrium of the vehicle, a maximum steering angle on a steered wheel of an equivalent bicycle model of the vehicle,
        a second unit configured to determine a gearing-down ratio according to the maximum range of the control member and the maximum steering angle, and
        a third unit configured to determine a steering angle according to the gearing-down ratio and the requested steering signal, wherein the vehicle includes four steered wheels mechanically connected in terms of steering via a plurality of axles such that an actuator is utilized per axle, wherein the third unit is configured to determine a transverse coordinate of an instantaneous center of rotation of the vehicle by determining an equivalent turning angle on the steered wheel of the equivalent bicycle model as a function of the gearing-down ratio and the requested steering signal, by marking an intersection between a straight line perpendicular to a plane of a non-steered wheel of the bicycle model and a straight line perpendicular to a plane of the steered wheel of the equivalent bicycle model turned through the equivalent turning angle, and by adopting, as a value of the transverse coordinate of the instantaneous center of rotation of the vehicle, a value of a transverse coordinate of the intersection, wherein the system further comprises a module configured to control a steering behavior of the vehicle to enable a determination of a longitudinal coordinate of the instantaneous center of rotation of the vehicle from the speed of the vehicle, and wherein the third unit is configured to determine a respective control angle of each of the plurality of axles from the transverse and longitudinal coordinates of the instantaneous center of rotation of the vehicle.

11. A system according to claim 1, wherein the vehicle includes a steered axle connected to two steered wheels, wherein the system comprises an actuator per steered wheel, and wherein the third unit is configured to determine an equivalent steering angle on the steered wheel of the equivalent bicycle model as a function of the gearing-down ratio and the requested steering signal, to mark an intersection between a straight line perpendicular to a plane of a non-steered wheel of the equivalent bicycle model and a straight line perpendicular to a plane of the steered wheel of the equivalent bicycle model turned through the equivalent steering angle, the intersection giving a transverse coordinate of the instantaneous center of rotation of the vehicle, and to determine a respective control angle of each of the steered wheels.

12. A steering control system with variable ratio for a land vehicle that includes two or more wheels, at least one of which is steered, the vehicle including a control member available to a driver for steering the vehicle, the control member being maneuverable within a maximum range between a leftward stop and a rightward stop and delivering a requested steering signal quantified in terms of amplitude and direction, the steering control system comprising:

at least one actuator configured to act on a steering angle of the at least one steered wheel; and a controller that uses as input variables at least a speed of the vehicle and the requested steering signal in order to determine, for each actuator, a control angle according to which the actuator is controlled for steering the vehicle, wherein the controller includes:

a first unit configured to determine, at least according to the speed of the vehicle and a parameter characteristic of an equilibrium of the vehicle, a maximum steering angle on a steered wheel of an equivalent bicycle model of the vehicle, a second unit configured to determine a gearing-down ratio according to the maximum range of the control member and the maximum steering angle, and a third unit configured to determine a steering angle according to the gearing-down ratio and the requested steering signal, wherein the vehicle includes four steered wheels, wherein the system comprises an actuator per steered wheel, wherein the third unit is configured to determine an equivalent steering angle on the steered wheel of the equivalent bicycle model as a function of the gearing-down ratio and the requested steering signal, to mark an intersection between a straight line perpendicular to a plane of a non-steered wheel of the equivalent bicycle model and a straight line perpendicular to a plane of the steered wheel of the equivalent bicycle model turned through the equivalent steering angle, the intersection giving a transverse coordinate of the instantaneous center of rotation of the vehicle, wherein the system further comprises a module configured to control a behavior of the vehicle in terms of steering to enable a determination of a longitudinal coordinate of the instantaneous center of rotation of the vehicle from the speed of the vehicle, and wherein the third unit determines a respective control angle of each of the steered wheels from the transverse and longitudinal coordinates of the instantaneous centre of rotation.

13. A system according to claim 1, wherein the requested steering signal delivered by the control member is an electrical signal, and wherein each actuator is electrical.

14. A system according to claim 10, wherein the module is configured to calculate a connecting curve between an initial center of rotation at zero speed and an instantaneous transition center of rotation at a transition speed, the connecting curve being tangent to a straight line parallel to an axle of the vehicle, and wherein the longitudinal coordinate of the instantaneous center of rotation of the vehicle is determined by reading a transverse coordinate at a site that includes the connecting curve and the straight line parallel to the axle of the vehicle for a speed of the vehicle less than the transition speed, and wherein the longitudinal coordinate of the instantaneous center of rotation of the vehicle is equal to a longitudinal coordinate that is a function of a speed of the vehicle beyond the transition speed.

15. A system according to claim 12, wherein the module is configured to calculate a connecting curve between an initial center of rotation at zero speed and an instantaneous transition center of rotation at a transition speed, the connecting curve being tangent to a straight line parallel to an axle of the vehicle, and wherein the longitudinal coordinate of the instantaneous center of rotation of the vehicle is determined by reading a transverse coordinate at a site that includes the connecting curve and the straight line parallel to the axle of the vehicle for a speed of the vehicle less than the transition speed, and wherein the longitudinal coordinate of the instantaneous center of rotation of the vehicle is equal to a longitudinal coordinate that is a function of a speed of the vehicle beyond the transition speed.

16. A system according to claim 14, wherein the connecting curve is an ellipse.

17. A system according to claim 15, wherein the connecting curve is an ellipse.

18. A system according to claim 14, where a transverse coordinate of the instantaneous center of rotation at the transition speed is determined by using as an input parameter a maximum transverse acceleration parameter of the vehicle and the transition speed.

19. A system according to claim 15, where a transverse coordinate of the instantaneous center of rotation at the transition speed is determined by using as an input parameter a maximum transverse acceleration parameter of the vehicle and the transition speed.

20. A system according to claim 18, wherein the maximum transverse acceleration parameter is a parameter for adjusting the system and keeps a fixed value during a functioning of the system.

21. A system according to claim 19, wherein the maximum transverse acceleration parameter is a parameter for adjusting the system and keeps a fixed value during a functioning of the system.

22. A system according to claim 18, wherein the maximum transverse acceleration parameter is calculated in real time according to conditions of use of the vehicle.

23. A system according to claim 19, wherein the maximum transverse acceleration parameter is calculated in real time according to conditions of use of the vehicle.

24. A steering control system according to claim 1, wherein the system is incorporated in a path controller that superimposes corrections determined by a control function and determines a corrected steering angle for each of the at least one steered wheel, each corrected steering angle including a component resulting from the requested steering signal and a correction component.

* * * * *

UNITED STATES PATENT AND TRADEMARK OFFICE
CERTIFICATE OF CORRECTION

| | | |
|---|---|---|
| PATENT NO. | : 8,036,793 B2 | Page 1 of 1 |
| APPLICATION NO. | : 11/909758 | |
| DATED | : October 11, 2011 | |
| INVENTOR(S) | : Thierry Auguet et al. | |

It is certified that error appears in the above-identified patent and that said Letters Patent is hereby corrected as shown below:

COLUMN 3

Line 54, "Gcorresponds" should read --G corresponds--.

COLUMN 5

Line 24, "agreed:" should read --noted:--.

COLUMN 9

Line 33, "determines" should read --determine--.

COLUMN 12

Line 25, "centre" should read --center--.
      Line 66, "where" should read --wherein--.

Signed and Sealed this
Twentieth Day of December, 2011

David J. Kappos
*Director of the United States Patent and Trademark Office*